United States Patent [19]

Fedele

[11] Patent Number: 4,914,675
[45] Date of Patent: Apr. 3, 1990

[54] APPARATUS FOR EFFICIENTLY PACKING DATA IN A BUFFER

[75] Inventor: Nicola J. Fedele, Kingston, N.J.

[73] Assignee: General Electric Company, Schenectady, N.Y.

[21] Appl. No.: 149,556

[22] Filed: Jan. 28, 1988

[51] Int. Cl.[4] ............................................. H04B 14/04
[52] U.S. Cl. .................................... 375/25; 358/261.1; 341/67
[58] Field of Search ...................... 375/25, 27, 122; 358/260, 261, 262, 261.1, 261.2, 261.3, 261.4; 341/67, 106; 364/254.9, 245.1

[56] References Cited

U.S. PATENT DOCUMENTS

| | | | |
|---|---|---|---|
| 3,134,091 | 5/1964 | Shugart | 364/900 |
| 3,761,613 | 9/1973 | Limb | 178/7.1 |
| 4,093,962 | 6/1978 | Ishiguro et al. | 358/138 |
| 4,101,934 | 7/1978 | Fukuoka | 375/25 |
| 4,302,775 | 11/1981 | Widergren et al. | 358/136 |
| 4,334,246 | 6/1982 | Saran | 358/261 |
| 4,376,933 | 3/1983 | Saran et al. | 341/99 |
| 4,467,447 | 8/1984 | Takahashi et al. | 364/900 |
| 4,488,175 | 12/1984 | Netravali | 258/136 |
| 4,569,058 | 2/1986 | Grallert | 375/27 |
| 4,574,382 | 3/1986 | Ko | 375/25 |
| 4,660,079 | 4/1987 | Devimeux et al. | 375/24 |
| 4,691,233 | 9/1987 | Acampora | 358/136 |
| 4,700,226 | 10/1987 | Acampora | 358/136 |
| 4,706,260 | 11/1987 | Fedele et al. | 375/27 |

OTHER PUBLICATIONS

"Picture Coding: A Review" Arun N. Netravali, Proceedings of the IEEE vol. 68, No. 3, Mar. 1980, pp. 366-406.

Primary Examiner—Robert L. Griffin
Assistant Examiner—Stephen Chin
Attorney, Agent, or Firm—Paul R. Webb II; James C. Davis, Jr.

[57] ABSTRACT

Variable-length codewords are grouped into successive N bit word groups in sequential order as received from a variable length codeword encoder. The N-bit groups are each stored in corresponding N-bit-wide memory locations in a buffer memory prior to transmission over a channel. The locations are filled to capacity on one clock pulse and emptied on a second clock pulse to efficiently utilize the memory at a given clock rate.

34 Claims, 6 Drawing Sheets

APPARATUS FOR EFFICIENTLY PACKING DATA IN A BUFFER

This invention relates to an apparatus for filling a buffer with data and more particularly to such apparatus as employed in a data communication system.

Of interest, is copending application Ser. No. 130,379 filed Dec. 8, 1987 entitled "Modified Statistical Coding of Digital Signals", in the name of N. J. Fedele assigned to the assignee of the present invention and U.S. Pat. Nos. 4,691,233 and 4,700,226 both in the name of A. A. Acampora and U.S. Pat. No. 4,706,260 entitled "DPCM System with Rate-of-Fill Control of Buffer Occupancy" in the name of Fedele et al.

In data communication systems of limited bandwidth, differential pulse code modulation (DPCM) is widely used for data compression. The DPCM system is often used in the transmission of television pictures, especially in teleconferencing applications employing satellite transmission systems or other transmission mediums which have relatively narrow bandwidths. While the present invention is especially suitable with a DPCM system, it may be utilized with any data communication system for which maximum efficiency of transmission and cost effectiveness of hardware is desirable.

Typically in a DPCM system, a transmitter includes an analog-to-digital converter for finely quantizing a source of analog television information signals. The finely quantized signal is applied to a subtractor which subtracts predicted delayed information picture signals which may employ either temporal or spatial filtering techniques. The subtracted signal is coarsely quantized to convert numerous luminance signal values of a television picture for example to relatively few signal values. Generally, for television transmission, a coarse quantizer may, for example, have 32 output values as compared to 256 values for the finely quantized signal.

In the interest of transmission efficiency, this kind of system tends to encode redundant picture information, (that is, information that does not change from one picture frame to another in temporal systems or that does not change from line to line in spatial systems) with zero run length codes. The changing picture portions producing non-zero values are usually encoded first with amplitude codes. Typically, a statistical encoder used in these systems assigns variable length codewords to the different run length and amplitude values of the coarsely quantized signal. The shorter length codewords are assigned to those signal values which occur more frequently and the greater length codewords are assigned to those signal values which occur less frequently.

Statistical encoding schemes employing Huffman or some other arrangement such as, for example, disclosed in aforementioned copending application Ser. No. 130,379 produce variable-length codewords. Variable-length encoders for such codes are disclosed, for example, in the aforementioned patents in the name of Acampora and in U.S. Pat. No. 4,093,962 in the name of Ishiguro; U.S. Pat. No. 4,569,058 in the name of Grallert; U.S. Pat. No. 4,302,775 in the name of Widergren et al.; and U.S. Pat. No. 4,488,175 in the name of Netravali, among others.

Normally in these systems, the variable-length codewords are applied to a rate buffer, typically a first-in/first-out (or FIFO), which has a relatively large memory supplying output at a fixed data rate for transmission over a channel. The memory normally is made sufficiently large so that as the variable length codewords are filled into the memory, the constant data rate at its output will neither empty the buffer nor permit the buffer to overfill. However, systems are available to provide more accurate control over the buffer fill state. Such a control system is disclosed, by way of example, in the aforementioned Acampora patents and in the Ishiguro U.S. Pat. No. 4,093,962.

Rate buffers employ a memory comprising a plurality of fixed-width N-bit wide locations. The variable-length codewords are each clocked in parallel into a separate location. Therefore, a codeword that represents a more frequently occurring signal value (which may have a length of say two to five bits, for example), will occupy a buffer memory location capable of holding as many as N-bits, (for example, twenty bits). Each codeword is clocked into a separate location at a separate clock cycle. The next codeword, which may be thirteen bits long, is thus clocked into the next location. Since codewords are assigned to a given location based on order of occurrence and not on length, the locations necessarily need to have capacity for the maximum length word. The words are applied to the buffer in parallel and therefore are each clocked in a given single clock pulse. Typically, rate buffers may include a parallel-to-serial converter at the output thereof for converting the parallel bits to a stream of serial bits for transmission over a channel. The use of excess capacity in the rate buffer to accomodate potential codewords of a maximum length regardless of whether in fact such codewords of maximum length statistically occur less frequently then the codewords of shorter length is a necessary condition to the hardware of such a system.

In some cases to more efficiently pack the rate buffer, a parallel-to-serial converter is used prior to the rate buffer to generate a serial stream of bits to fill the buffer. Such a system is disclosed by way of example in U.S. Pat. No. 3,761,613 issued to Limb. However, the problem with this kind of a system is that each bit of an encoded codeword needs to be clocked at a separate clock pulse into the buffer memory. To clock each bit into memory separately is time inefficient. For example, if a fifteen bit codeword is to be entered into memory, fifteen separate clock pulses are needed. While the memory may have greater packing density, this kind of a system is slow and not viable for current teleconferencing television transmitting systems. The greater the intensity of the motion in the picture, the slower the information is entered, which could eventually impede the fixed-rate transmission process.

Where variable-length codewords are entered into the buffer memory in parallel, buffer memory space is wasted and thus memories much larger than necessary are required for the amount of data being stored to accomodate the occasional long codewords. As data rates increase, the buffer memory is similarly required to have increased capacity to accomodate the much greater rate of fill of the buffer memory. However, the addition of more memory adds greater complexity to the system, which increases the system cost. As known, to provide an inverse decoding operation, the receiver is required to duplicate the memory of the transmitter. Therefore, all hardware added to the transmitter in the name of increased memory capacity is necessarily added to the receiver as well, further increasing the cost of the system hardware.

An apparatus according to the present invention efficiently packs sequentially occurring variable-length codeword data in an input signal into memory means, for subsequent transmission over a channel. The memory means includes a plurality of data storage locations each having an N-bit storage capacity. The apparatus comprises data grouping means responsive to the variable length codeword signal applied as an input thereto for organizing the variable length codewords into N-bit-long data groups. Each group contains codeword data in an ordinal position according to a first given sequence of occurrence of the data of that data group. The group is outputted from the grouping means in a second given sequence for storage in a memory means storage location in a third given sequence. Each group is stored in a separate, corresponding location whereby each location containing data is filled to capacity with a single clock pulse.

Figure 1:
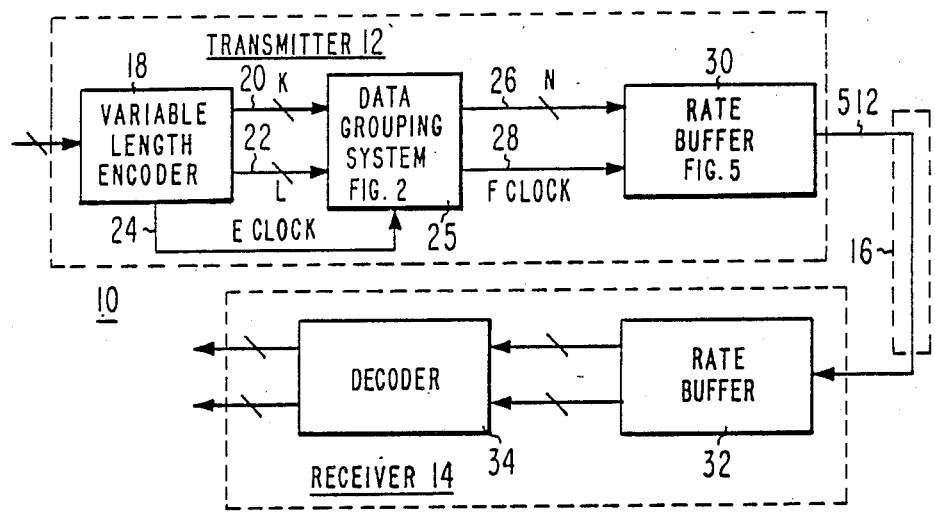
FIG. 1 is a block diagram of a portion of a DPCM communication system according to one embodiment of the present invention.

In FIG. 1, system 10 includes a transmitter 12 which transmits over a serial channel 16 to a receiver 14. Only so much of the transmitter 12 and receiver 14 are illustrated as being necessary for understanding the present invention. The present embodiment is described in terms of a DPCM transmission system by way of example. It should be understood that the present invention may be employed in any kind of data transmission system where variable-length codewords are generated.

The transmitter 12 includes a variable length encoder 18 which produces variable-length codewords having a maximum length K on conductor 20 and a codeword length signal on conductor 22. The variable length codewords on conductor 20 each have a given length (number of bits) which may vary randomly to a maximum of K. In this embodiment K is assumed to have a value of eighteen. The signal on conductor 22 may have a length L which is assumed in this embodiment to be five bits and represents the bit length of a corresponding codeword on conductor 20. The E clock is a clock signal transmitted on conductor 24 comprising a series of pulses each representing a pixel or codeword on conductor 20.

Encoder 18 may be of conventional design, such encoders being described in the prior-mentioned patents noted above in the introductory portion. Preferably, encoder 18 may be constructed as disclosed in the aforementioned copending patent application in the name of Fedele entitled "Modified Statistical Coding for Digital Signals". However, what is important about the encoder 18 with respect to the present invention is that a first signal on conductor 20 has a maximum codeword length of K bits, that a second signal of L-bit length on conductor 22 represents the number of bits in the corresponding codeword on conductor 20 and that a clock signal represents the occurrence of each codeword. Design of hardware to generate the above kind of data signals on conductors 20, 22 and 24 is within ordinary skill in the encoder art. For example, the encoder may include a first ROM look-up table for the codewords and a second ROM look-up table containing the codeword lengths of such codeword. The corresponding codeword and length data are accessed by a given address.

Figure 2:
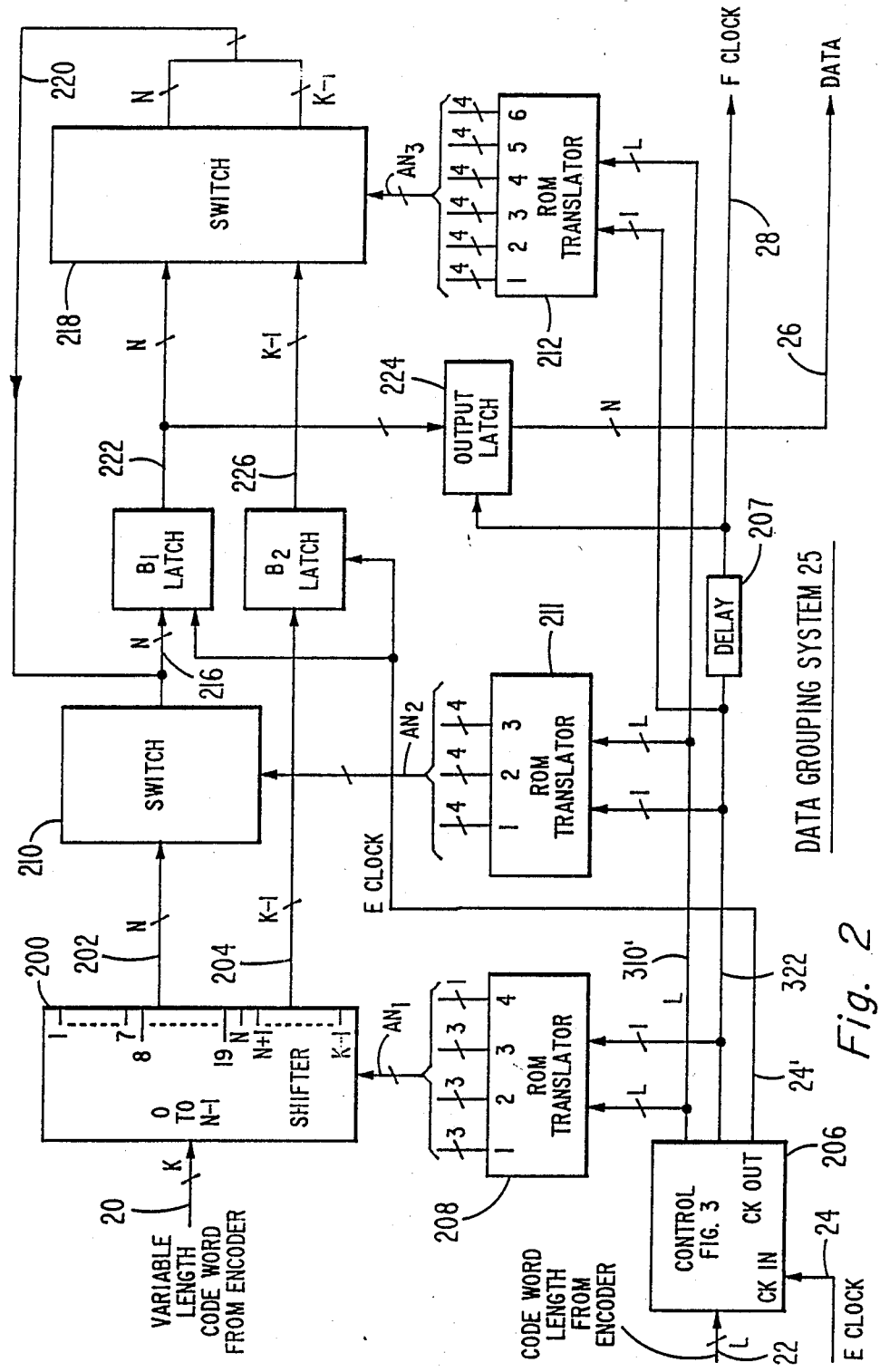
FIG. 2 is a more detailed block diagram of the data grouping system of FIG. 1.
Figure 5:
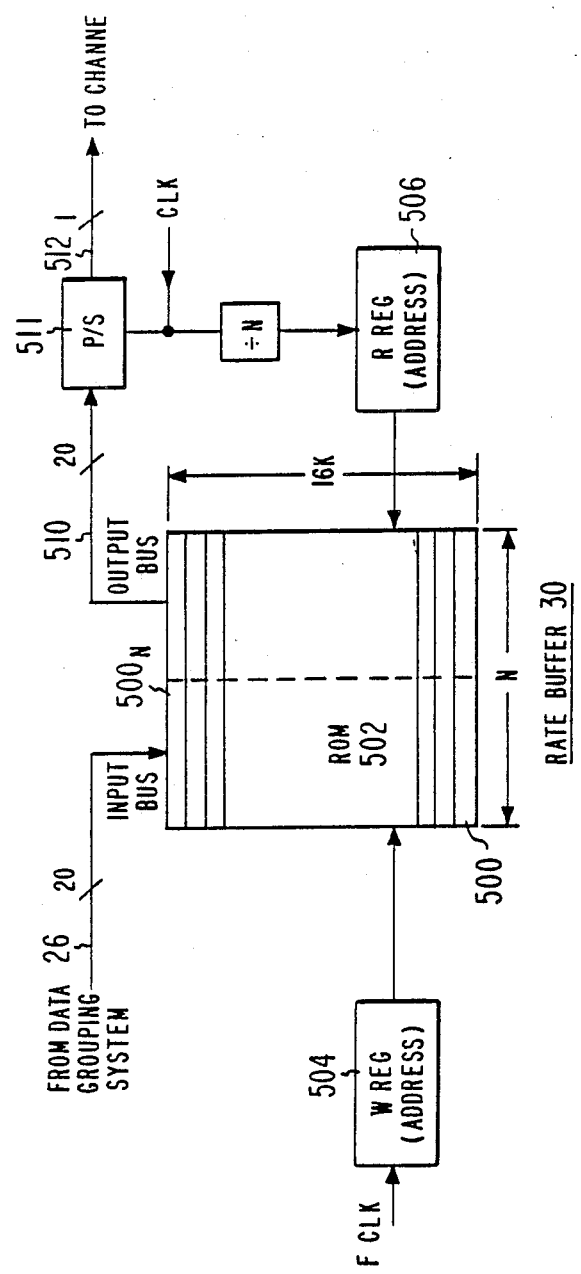
FIG. 5 is a block diagram showing in more detail the rate buffer of FIG. 1.

The signals on conductors 20, 22 and 24 are applied to data grouping system 25 which is described in more detail in FIG. 2. System 25 in accordance with the present invention constructs from the information on conductors 20, 22 and 24 N-bit data groups on output conductor 26. The groups of data on conductor 26 always are fixed-length N-bits. A clock pulse, F clock, on conductor 28 represents the generation of a group of N-bits on conductor 26 and clocks each N-bit data group into rate buffer 30. Rate buffer 30 is of conventional design sometimes referred to as a first-in/first-out (or FIFO) based memory system and is illustrated in FIG. 5 for purposes of explaining the signficance of the data grouping system 25. The rate buffer 30, as will be shown, has a plurality of data storage locations typically by way of example, 16K words (or 40K bytes capacity) for a 384K bits/sec transmission system. In this example each location contains N slots for storing N-bits of data. N, in this case, represents twenty data bits. However for other implementations, the number of bits on conductor 26 in a group of data bits and the bit length of a given location in a buffer 30 may differ from twenty in accordance with that implementation.

Each group of N-bits is sequentially entered into a different location in buffer 30 in a known way by an F clock pulse on conductor 28. The rate buffer includes a parallel-to-serial converter near its output, which converter converts the parallel bits stored in each of the locations into a serial stream for transmission over the channel 16. The serially transmitted bits are received by rate buffer 32 at the receiver and the encoded signals are decoded by decoder 34 as part of the receiver 14. The inverse DPCM operation is performed by other well known apparatus not shown in receiver 14.

It will be recognized that system 25 of the present invention takes variable-length codewords and arranges the variable length codewords into fixed-data-length groups of N-bits each in real-time, this arrangement being done based on the sequence of occurrence of the variable-length codewords. Each such N-bit group is stored in a different buffer 30 location to completely fill that location to capacity. Each location of the buffer 30 is sequentially filled with the exact number of bits necessary to fill that location. Thus, the rate buffer is efficiently utilized so that the memory locations thereof containing data are filled to a maximum while maintaining the correct data placement within the transmitted data stream. This provides for efficient utilization of memory and is cost effective in terms of hardware for a given data rate.

In FIG. 2, system 25 includes a data shifter 200. Shifter 200 shifts input signals on input conductor 20 from the variable length encoder 18 (FIG. 1) a maximum of N−1 positions wherein it will be recalled N represents the number of bits in each group to be created by system 25. However, conductor 20, as mentioned above, provides K-bits in parallel to the shifter 200, K in this example being eighteen. The shifter 200 shifts the incoming bits received in parallel on K input lines for each codeword an amount such that at least N output lines of shifter 200 on conductor 202 eventually will receive bits in parallel from the sequential occurring codewords on conductor 20. Should the cumulative successive codewords on conductor 20 which contain at least N-bits contain bits in excess of N, $N_E$, the excess may be up to K−1 bits. As statistically frequently would occur, those $N_E$ excess bits are shifted to appear on output conductor 204. Statistically, as many as K−1 bits may appear on conductor 204 as $N_E$ bits. The reason for K−1 bits on conductor 204 is that if nineteen bits (N−1) are shifted to parallel lines of conductor 202 and the next occurring codeword has K bits (18), then the twentieth bit (one of the K bits) is processed on conductor 202 and the remaining bits of the $N_E$ group (K−1) are processed on each of the parallel lines of conductor 204.

By way of example, if a seven-bit codeword $X_1$ is initially received by shifter 200, the bits of that codeword each appear at a different shifter 200 output 1–7 in ordinal position of occurrence starting from position 1. If the next codeword $X_2$ is twelve bits long, it is shifted seven places so that its bits appear on outputs 8–19. If the next codeword $X_3$ is three bits long, it is shifted nineteen places so as to appear at outputs N through N+2 (20–22). Thus, N-bits (20) are applied to conductor 202 and two bits in excess of N, $N_E$, are applied to conductor 204. Upon receipt of the next codeword $X_4$ shifter 200 shifts that number of places from the unshifted zero position as indicated by the number of bits in excess of N, $N_E$, or two places. Assume word $X_4$ has four bits. These bits are shifted to shifter outputs 3–7, skipping positions 1–2 for reasons to be explained. Assuming the next codeword $X_5$ has five bits, these five bits are shifted seven places so they appear on outputs 8–12 and so on. Each time $N+N_E$ bits are shifted, the shifter shifts the next occurring codeword $N_E$ places from the zero shift position, that is, $N_E$ places from the shifter beginning position. It should be understood that the term "conductor" employed herein is intended to include multiple conductor lines for carrying signals in parallel as known in this art. The shifter 200 shifts the input signal from conductor 20 to those output lines on conductors 202 and 204 according to a control signal received on conductor $AN_1$ from translator 208.

It should be understood that the shifter 200 does not store the data bits that are received, but serves only to shift postions of the received bits to direct the bits to different output slots. It is possible for shifter 200 to shift the position of the incoming codewords as many as N−1 shifts or nineteen places in this example.

Control 206 generates the control signal that is applied to translator 208. Translator 208 in turn generates the shifter control signals produced on conductor $AN_1$ which cause shifter 200 to shift as described above upon the receipt of each codeword in sequence.

Figure 3:
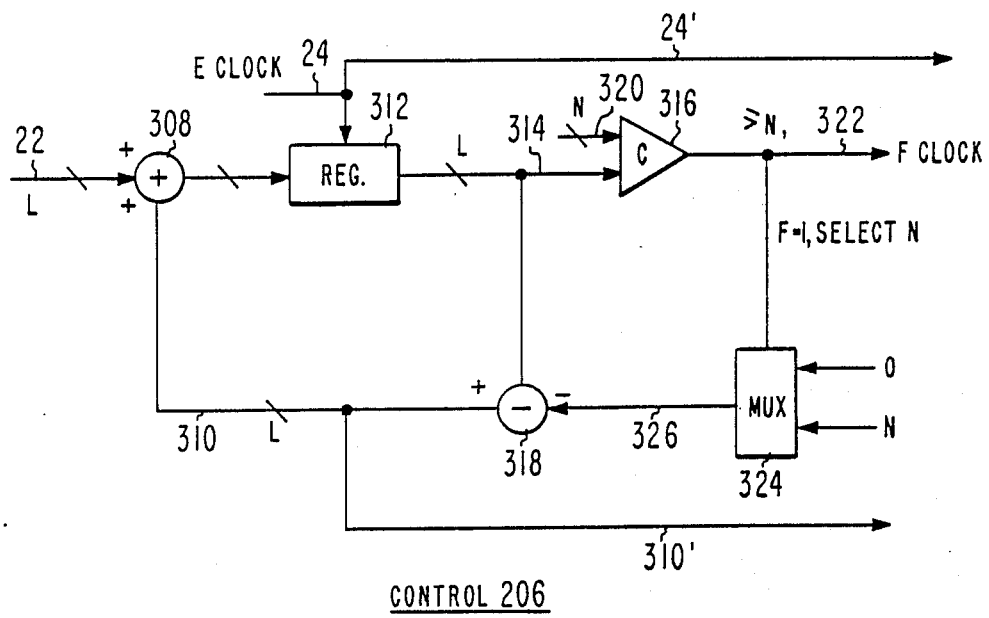
FIG. 3 is a block diagram of the control of FIG. 2.

FIG. 3 shows control 206 in greater detail. In FIG. 3, control 206 receives the codeword length signals on conductor 22, each signal having the same L-bit length. The codewords on conductor 22 indicate the length of each word (number of bits). In this example, L is five bits. The L-bit codeword length signal is applied to adder 308, which adds a subtracted codeword signal on conductor 310 to the codeword length signal received on conductor 22. The cumulative length of the subtracted codeword on conductor 310 is added to the codeword length on conductor 22 by adder 308. The added signals are clocked into register 312 at each encoder E clock pulse on conductor 24, each E clock pulse representing a codeword.

The output of register 312 is L-bit long words which represent the cumulative length values or number of bits in the codewords on conductors 22 and bits on conductor 310. The output of register 312 is applied to conductor 314, to comparator 316 and to subtractor 318. A second input of comparator 316 is on conductor 320 which receives a signal from a source having a value representing N-bits. Comparator 316 compares the totalled length of bits value of the signal on conductor 314 to the fixed number of bits N on conductor 320.

If the number of bits represented by the signal L on conductor 314 is N-bits or greater, then the output of the comparator 316 is a logical high, i.e., a one. This produces a signal referred hereinafter as an F clock on conductor 322. The F clock is applied to buffer 30 (FIG. 1) via conductor 28 and to latch 224, FIG. 2, delayed one half cycle by delay 207. The F clock signal is applied directly without delay to ROM translators 208, 211 and 212. The logical one level of the F clock signal manifests that a group of at least N-bits has been received. This is significant, as will be explained. If the number of bits at the output of register 312 on conductor 314, FIG. 3, is less than N, that is from zero to nineteen bits in this embodiment, then the output of comparator 316 on conductor 322 is a logical zero.

The F clock signal on conductor 322 is also applied as an input to MUX 324. The MUX 324, depending on the logical level of the signal on conductor 322, applies either a zero to its output conductor 326 in the case of a logical zero on conductor 322 or a signal having a numerical value N for a logical one. Assume that the first codeword $X_1$ applied on conductor 22 has seven bits and no prior words have been received, then the output of register 312 is numerical zero at time $T_0$, FIG. 6. This numerical zero value is applied to comparator 316 and compared to the number N. Because the output of register 312 is less than N at this time, the output of comparator 316 on conductor 322 is a logical low. A logical low causes a numerical zero to be applied by the MUX 324 to output conductor 326. Subtractor 318 subtracts this numerical zero from the numerical zero on conductor 314 applying the difference, which is also a numerical zero to conductors 310 and 310′. This represents an address that is applied to translators 208, 211 and 212 in the data grouping system 25 of FIG. 2. At the next clock pulse at time $T_1$, FIG. 6, the number seven bits is indicative of codeword $X_1$ having clocked into register 312, applying that value of seven on conductor 314. This value is less than N so the difference signal on conductors 310 and 310′ is seven less zero, or seven.

The seven value on conductor 310 is added to the next received codeword length signal on conductor 22 by adder 308. Assuming that the next codeword $X_2$ has twelve bits, those twelve bits are added to the seven bits on conductor 310 to form a word group having a nineteen bit length. Those nineteen bits are stored in register 312 at the next clock at time $T_2$. After time $T_2$, those nineteen bits appear on conductor 314 and the comparator 316 output is again low because the nineteen bits are still less than N on conductor 320. MUX 324 applies a numerical zero on conductor 326 to subtractor 318 which again subtracts numerical zero from the signal on conductor 314 and produces on conductor 310 a signal representing nineteen consecutive bits. This signal is applied via conductor 310′ to the translators 208, 211 and 212 and to adder 308 via conductor 310.

Adder 308 adds the next incoming codeword $X_3$, which is assumed to have three bits, to the nineteen bits to form a twenty-two bit group which is clocked into register 312 at the next clock pulse at time $T_3$. Conductor 314 at this time has the number twenty-two thereon to be applied to comparator 316. Since N (here assumed twenty) is smaller than twenty-two, the F clock signal on conductor 322 goes high. The high on conductor 322 causes MUX 324 to apply N to the output 326. The N value twenty is subtracted from the twenty-two bit signal on conductor 314 to produce the number two on conductor 310. This number two is now the address to translators 208, 211 and 212 FIG. 2. This number two is supplied to adder 308 and is added to the number specifying the length of the next codeword $X_4$ on conductor 22, assuming $X_4$ to be a four bit-long word, the sum signal six is clocked into register 312 from adder 308 output. This process continues with the comparator producing a numerical zero on conductor 322 until the number accumulated in register 312 is equal to N or more.

The conductor 310' connected to conductor 310 is the output of control 206. This output is supplied to conductor 310 which carries a control signal representing the resulting number after subtraction by subtractor 318. Whenever the sum of the codeword length appearing on conductor 22 at the input of control 206 added to the numerical value of the number of bits on conductor 310 is less than N, (twenty in this case), then the output control signal on conductor 310' represents the accumulated lengths of the codeword received at conductor 22 and the addition of $N_E$ representative of extra bits of the prior codewords, if any. When a codeword length is received which causes the accumulated codeword group length to be N-bits or greater, then the output signal on conductor 310' represents $N_E$, the difference of the accumulated bit lengths less N. The signal on conductor 310', FIG. 2, addresses the ROM translators 208, 211 and 212 in combination with the F clock signal on conductor 322.

In FIG. 2, the ROM translator 208 in response to the signals received thereto on conductors 310' and 322 translates the number of bits represented by the signals into a shift value for causing the shifter 200 to shift a number of places represented by the address on conductors 310' and 322. Thus, for example, assume conductor 310' has the address seven on it between time periods $T_1$ and $T_2$. Conductor 322 has a low F clock. These signals are applied to translator 208 (FIG. 2) as a combined address which decodes this address into signals on translator outputs 1, 2, 3 and 4. Shifter 200 in response to the translator 208 outputs shifts its inputs seven places from the zero position. The translator 208 outputs 1, 2 and 3 each represent by way of example a three bit code which is capable of identifying eight states only six of which are used. The outputs 1, 2 and 3 are then capable of describing a total eighteen different states; and the fourth output represents another state. Therefore, the four ROM translator 208 outputs represent nineteen different states and can shift the shifter 200 output a total of nineteen different positions, i.e. N—1.

Figure 6:
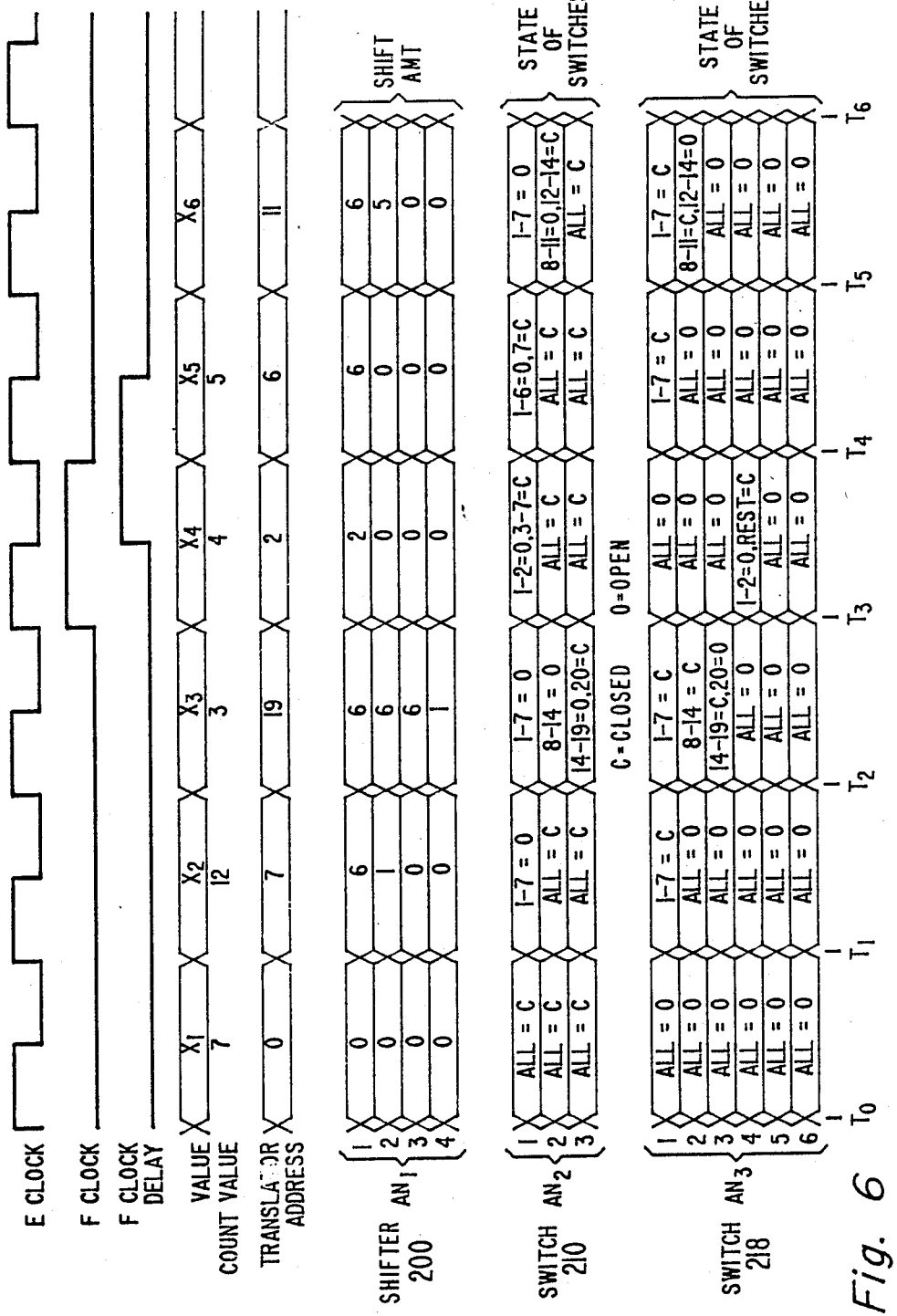
FIG. 6 is a timing diagram useful for explaining the principles of the present invention.

Returning to the example discussed above, assuming the first address on conductors 310' and 322 represent a codeword having a seven bit length, the translator output 1 on conductor $AN_1$ FIG. 6 causes the shifter to shift six places and output 2 causes the shifter to shift one place for a total shift of seven places. At time $T_1$ the next codeword $X_2$ received by shifter 200 will be applied to the shifter positions beginning with position 8. Assuming the next codeword $X_2$ has twelve bits in it, these twelve bits are each shifted seven places at time $T_1$. So far all of the shifted outputs of shifter 200 are applied to conductor 202 which will be recalled contain N lines each connected to a different shifter 200 output.

Assume the next codeword $X_3$ is three bits long and the total number of bits received by control 206 is 22. The subtracted signal on conductor 310' is the number of bits in excess of N, $N_E$, e.g., twenty-two minus N, or two bits. Two appearing on conductor 310' and the logical one appearing on conductor 322 together causes the translator 208 to generate a shift signal on output 1 causing shifter 200 to shift $X_3$ two places from the zero position. Assuming the next codeword $X_4$ received has a four bit length, then that four bit codeword will be shifted $N_E$ two places from the zero position and the codeword $X_4$ will occupy positions 3–6 of the shifter 200 output. This way the shifter applies to conductor 202 the first N-bits of the sequentially received bits of a group of codewords and applies the $N_E$ bits in excess of N of that codeword group to conductor 204, FIG. 2. After at least N-bits are received, the next received bits are shifted $N_E$ places from the shifter N position. This process continues for each group of at least N-bits received by control 206 and shifter 200.

The ROM translator addresses applied from control 206 are delayed one clock pulse from the time the initial codeword is applied to shifter 200 and to the input of latches $B_1$ and $B_2$ by the action of register 312 of control 206. The latches $B_1$ and $B_2$ are clocked by the E clock signal on conductor 24'.

Since shifter 200 is not a storage device, the bits applied to it are merely shifted in position to the different lines in parallel on conductors 202 and 204. The bits applied to conductor 202 are applied from shifter 200 through switch 210 to latch $B_1$. Latch $B_1$ is where twenty-bit lengths are accumulated for transfer to output latch 224, the accumulation being done by a process involving switches 210 and 218 that will be subsequently described in detail. The bits applied to conductor 204 are applied directly to latch $B_2$. Latch $B_2$ provides temporary storage of the $N_E$ bits in excess of those needed to complete filling places in latch $B_1$, which $N_E$ bits can then be entered into latch $B_1$ after emptying its contents to output latch 224. This latter creation is accomplished using switch 218 and will also be described in further detail later on.

Switch 210 serves to couple those outputs of shifter 200 on which codewords are then being applied or are anticipated in the succeeding clock cycle. Switch 210 also serves to decouple those shifter 200 outputs from latch $B_1$ which received codewords in prior clock cycles until at least N-bits have been latched into latches $B_1$ and $B_2$. Thus, for example, in FIG. 6, switch 210, at time $T_1$, opens or decouples the first seven lines of conductor 202 on which seven bits have previously been applied to the latch $B_1$ at time $T_1$. The remaining switches are closed.

The reason for the decoupling at time $T_1$ is as follows: If the shifter 200 were to remain coupled at those first seven outputs to latch $B_1$, upon the occurrence of the next E clock pulse at time T', the next codeword $X_2$, for example, the twelve bit codeword is clocked into latch $B_1$ and the seven bit codeword in latch $B_1$ will be latched out. However, the data in shifter 200 will be otherwise latched into latch $B_1$. Since the shifter 200 would have no bits at this time in the first seven outputs, those first seven bits would be lost. Therefore switch 210 decouples those first seven positions of latch $B_1$ from shifter 200. However, the problem remains to retain those first seven bits in latch $B_1$ which are latched out when the next twelve bits are loaded into latch $B_1$ upon the occurrence of the next clock pulse at time $T_2$. The solution is to return those seven bits to latch $B_1$ via switch 218, which will be discussed below.

The way the switching action is obtained is described below in connection with FIG. 4. Generally, ROM translator 211 receives the address produced by control 206 on conductors 310′ and 322. The F clock signal on conductor 322 at time $T_1$ is low and translator 211 outputs 1, 2 and 3 decode the code applied thereto on conductor 322 into a switch 211 control signal on conductor $AN_2$. That signal produced by translator 211 opens the first seven positions of switch 210 at time $T_1$ leaving the remaining thirteen positions closed. The twelve bit codeword $X_2$ is placed in ordinal position at latch $B_1$ at time $T_2$ by the shifted position of shifter 200 via the closed contacts of switch 210.

Figure 7:
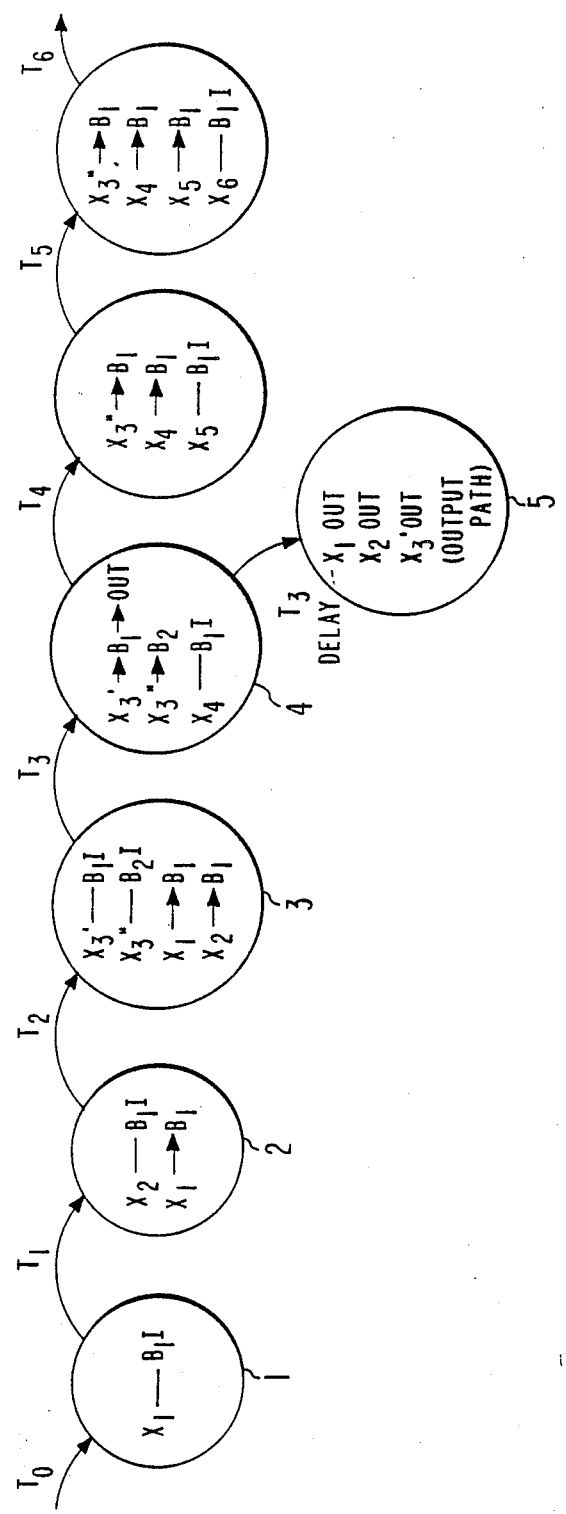
FIG. 7 is a state diagram illustrating the creation of the N-bit groups of data.

However, at time $T_1$, the twelve bit word $X_2$ is not latched into latch $B_1$ but is at the latch $B_1$ input as shown by state 2, FIG. 7. In FIG. 7, an arrow in the circles indicates data is latched, a hyphen indicates data ready to be latched at the next clock. The value twelve descriptive of $X_2$ being a twelve bit codeword added to the value seven descriptive of the previous seven bit codeword produces an address from control 206 specifying a seven place shift in shifter 200. That address applied to translator 211 opens the first seven positions of switch 210, FIG. 6, and the remaining positions remain closed. The twelve bits are latched into latch $B_1$ by the E clock pulse at time $T_2$. What happens with the first seven bits previously latched out of latch $B_1$ is that they are recirculated to the input of latch $B_1$ via switch 218, when latched out at time $T_2$. At time $T_2$, these first seven bits are also relatched back into latch $B_1$ for a total of nineteen bits. These conditions are illustrated by the state diagram, FIG. 7, at states 1 and 2. In state 1, word $X_1$ is at the input of latch $B_1I_1$ ($X_1-B_1I$). At state $2_1$ word $X_1$ is latched into latch $B_1$ at time $T_1$ ($X_1 \rightarrow B_1$) and word $X_2$ is at the latch B input ($X_2-B_1I$).

The outputs of latch $B_1$ are applied to conductor 222 and to latch $B_1$ input conductor 216 via output switch 218 and conductor 220. The latch $B_1$ outputs are also applied to output latch 224. Latch $B_1$ has N outputs which are applied in parallel on N lines of conductor 222. However, when the bits in latch $B_1$ are less than N, the F clock is low and latch 224 is inactive.

The $N_E$ bits in excess of N of a given set of codewords which form the first N-bits processed through shifter 200 are processed on conductor 204 to latch $B_2$. The output of latch $B_2$ is applied to K−1 lines on conductor 226 which applies the latch $B_2$ bits to the latch B inputs in ordinal position through switch 218 to conductor 220. At this time, the bits in latch $B_1$ are latched into latch 224 because the F clock is high. Switch 218 serves to recirculate the bits in latch $B_2$ in the first $N_E$ latch positions back to latch $B_1$ at conductor 216 in the same relative position those data bits were originally stored in latch $B_2$ from shifter 200. Switch 218 is controlled by ROM translator 212. Translator 212 has six output conductors each representing seven states which apply a control signal on conductor $AN_3$. Translator 212 translates the address on conductors 310′ and 322 into a control signal on conductor $AN_3$ for operating switch 218.

As mentioned above, when the first seven bits have been latched into latch $B_1$, the next twelve bits have been shifted seven places by shifter 200 through switch 210 to the latch $B_1$ input. When those 12 bits are latched into latch $B_1$ at time $T_2$, the address applied to the ROM translators 211 and 212 respectively open the first seven positions of switch 210 and close the first seven positions of switch 218. As a result, the codeword $X_2$ 12 bits is latched into latch $B_1$ and the codeword $X_1$ which was previously in latch $B_1$ is recirculated through the closed first seven positions of switch 218 back to the first seven places of latch $B_1$. The open state of the first seven positions of switch 210 preclude losing those first seven bits owing to the first seven positions of shifter 200 having no data bits. At time $T_2$ latch $B_1$ now contains nineteen bits.

When the next codeword $X_3$ is received by the system at time $T_2$, assuming $X_3$ is three bits, shifter 200 is shifted nineteen positions. One bit of that three bit codeword is applied to conductor 202 at the Nth position and the remaining two bits are applied on conductor 204 at the N+1 and N+2 shifter positions. One bit on conductor 202 is applied by switch 210 to the twentieth input of latch $B_1$ and the two bits on conductor 204 are applied directly to latch $B_2$. See state 3, FIG. 7. The bits at the input of latch $B_1$ are referred to as codeword $X_3'$ and the bits at the input to latch $B_2$ as codeword $X_3''$. The three bits are loaded into latches $B_1$ and $B_2$ at the next occurring E clock pulse at time $T_3$. Latch $B_1$ now has N-bits loaded therein and latch $B_2$ has two bits ($N_E$). The F clock pulse is delayed one half a clock cycle, FIG. 6, by delay circuit 207, FIG. 2, and applied to the output latch 224. Latch 224 outputs the twenty bits in latch $B_1$ to the data conductor 26 by the delayed F clock pulse.

The two bits in latch $B_2$ are recirculated by switch 218 onto conductor 220 to the first two positions of latch $B_1$. For this reason the shifter 200 in response to the address on control output 310′ applied to translator 208, has shifted two places from the zero position so that the next received codeword is shifted in ordinal position two places down from the zero position. This places the next codeword $X_4$, FIG. 6, which is assumed by way of example to be four bits long, into the third through seventh input positions of latch $B_1$. Therefore at time $T_4$ the latch $B_2$ two bit long codeword is outputted through switch 218 to the latch $B_1$ input, switch 210 is open in the first two positions and shifter 200 has been shifted by the ROM translator control signal in response to the two bit address applied to translator 208 from control 206. The switch 210 first two positions are open so as to preclude the latch $B_1$ from losing the first 2 bits of data. This process is continued for all subsequent occurring codewords.

Figure 4:
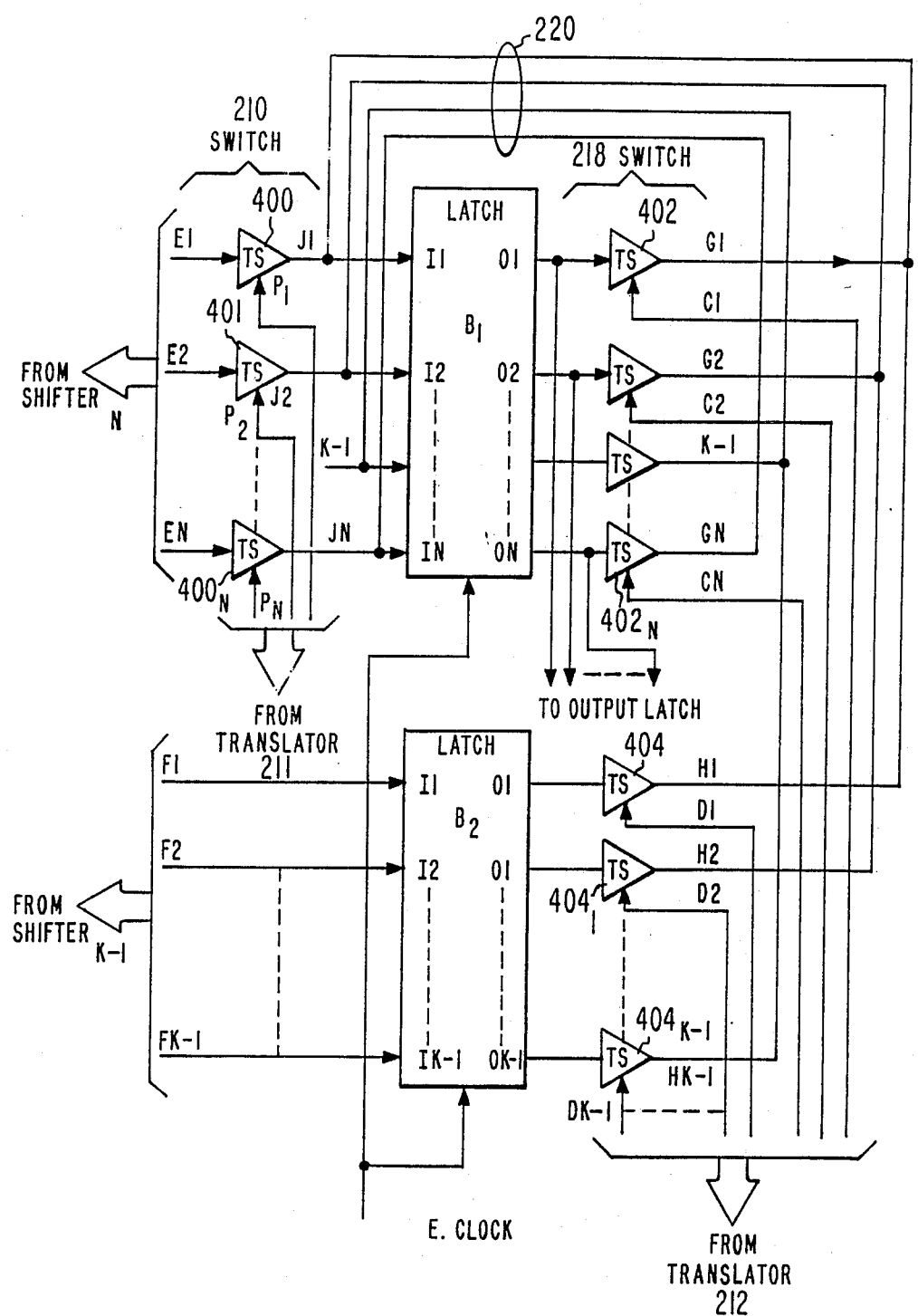
FIG. 4 is a schematic block diagram of the switches and certain of the latches of FIG. 2.

In FIG. 4, one example of switches 210 and 218 is illustrated employing tristate devices labeled TS. Each line from translator 211 is applied to a separate tristate device which controls the input of data into a corresponding respective input $I_1-I_N$ of latch $B_1$. The tristate devices are either closed (off) or open (on).

Devices 402 through $402_n$ are respectively controlled by translator 212. Tristate devices $402-402_n$ control the outputs 01–ON of latch $B_1$. Tristate devices 404 through $404_n$ respectively control the outputs 01–OK−1of latch $B_2$. By way of example, line E of conductor 202 is coupled to input $I_1$ of latch $B_1$ by conductor JI through tristate device 400. Conductor $E_2$ is applied as an input to input $I_2$ of latch $B_1$ via conductor $J_2$ through tristate device 401. ROM translator 211 controls device 400 via conductor P1 whereas tristate device 401 is controlled via conductor P2 and so forth. The output 01 of latch B1 corresponding to input I1 is applied via tristate device 402 to conductor G1 and its tristate device 402 is controlled by translator 212 via line C1. The conductor G is connected to conductor J1 so that the data bit in latch B1 at position 1 is recirculated via tristate device 402 to input I1 back into latch B1. When a signal is so circulated, tristate device 400 is open (off). Similarly, each of the tristate devices at the outputs of latch B1 recirculate the data bits back to the B1 latch inputs corresponding to those outputs. The input tristate devices 400-400$_n$ are open (off) corresponding to those bits being recirculated as shown in the diagram of FIG. 6.

Assuming that bits $N_E$ in excess of N have been applied to latch B2 then those bits are inputted into latch B2 upon their occurrence. Upon the detection of at least N-bits by the control 206, FIG. 2, at time T3, latch 224 outputs the N-bits of latch B1 to the output data conductor 26 by a one half clock delay after time T3. This is shown by the transition from state 4 to state 5, FIG. 7. Tristate devices 402-402$_n$ are all off preventing the bits in latch B1 from being recirculated back to the latch B1 input. Tristate devices 404 and 404$_1$ are closed (on) and all the remaining tristate devices corresponding to latch B2 are open (off).

Thus, at the next clock pulse, T4, the two bits in latch B2 are circulated via tristate devices 404 and 404$_1$ via conductors H1 and H2 to conductors J1 and J2 at the input of latch B1 applying those two bits respectively to inputs I1 and I2 of that latch. Recall at this time the shifter has shifted two positions and therefore incoming codewords shifted two positions can be latched into latch B1 at the third and et seq. positions of latch B1. Since the next codeword X4 is four bits then those four bits will occupy the next four positions of latch B1 by way of the next four tristate devices of switch 218 which will be closed (on). In this way, the tristate devices are switched on and off to load the latch B1. When the bits in latch B2 are recirculated into latch B1 to organize the next group of N bits a twenty bit codeword is latched into latch 224 at time T3 delay.

In FIG. 5, the F clock, which is delayed one half clock cycle, is applied to a write register 504 which addresses one of the locations 500-500$_n$ of ROM 502. ROM 502 has 16K locations (40K byte capacity) each location having a capacity of N bits (2.5 bytes). Each group of N-bits applied to ROM 502 completely fills one of the locations 500-500$_n$. The write register 504 automatically sequences to each of the locations in a known way to write the next succeeding group of N-bits into a successive location. The read register 506 reads the information from successive locations in sequence in a known way. The read register 506 causes the twenty bit word groups in ROM 502 to be outputted to an output bus 510. The twenty bit words are applied to a parallel-to-serial converter 511 which converts those successive twenty bit parallel bits inputs into a serial stream on conductor 512.

Because of the shift position of shifter 200, a portion of codeword X3 representing one bit having a reference designation X3' is at the input of latch B1 and a second portion of the same codeword X3 having a reference description X3" is at the input of latch B2. Upon the occurrence of the next clock pulse at time T3 codeword portion X3' is latched into latch B1 and is outputted at the delay of a one half clock pulse at T3 delay. At the time T3 delay, the codewords X1, X2 and codeword portion X3' are outputted in a single clock pulse. However, at time T3 as mentioned codeword portion X3" is latched into latch B2 and codeword X4 is applied to the input of latch B1 via the shift position of shifter 200 FIG. 2. Upon the occurrence of a clock pulse at time T4, the codeword portion X3" is latched into latch B1 from latch B2 via the tristate devices of switch 218 FIG. 4. The codeword X4 is also latched into latch B1 and the codeword X5 is applied to the input of latch B1 waiting for the next input latch clock pulse. At time T5 the E clock pulse latches the codewords X3" and X4 from B1 back into latch B1 via switch 218, and the codeword X5 is latched into latch B1 in the ordinal position as received by the system relative to the codeword portion X3" and codeword X4.

At this time, as shown in FIG. 6, assuming the codeword X3" portion represents 2 bits and codewords X4 and X5 represent four and five bits, respectively, then there are a total of eleven bits loaded into latch B1 with codeword X6 waiting to be loaded into latch B1. This process continues and repetitively outputs groups of N-bit words into the memory of rate buffer 30.

In FIG. 1, a signal source of video signals is assumed encoded by encoder 18. However, it should be understood that other types of signals other than video may be grouped by grouping system 25. In addition, multiplex switches may be provided (not shown) system 25 for multiplexing different video signals and grouping those different video signals into N-bit groups into different rate buffers (not shown). This utilizes system 25 for grouping the data of different video signals or other kinds of signals into different outputs. While tristate device switches are illustrated other types of devices may be used in accordance with a given implementation.

What is claimed is:

1. Apparatus for efficiently packing sequentially occurring variable length codeword data in an input signal into memory means for subsequent transmission over a channel, said memory means having a plurality of data storage locations each having a plurality of data storage locations each having an N-bit storage capacity; said apparatus comprising:

means for receiving the bits of said sequentially occurring codewords in parallel and for grouping the bits including portions of one or more codewords in accordance with the length of the codewords into a first group of parallel N-bits in order of occurrence of the bits in a plurality of said successively occurring codewords;

means for determining when said at least N-bits have been grouped and for outputting the bits of that N-bit group in parallel, the codewords forming said N-bit group at times having further bits; and means for organizing said further bits into their order of occurrence and forming with said organized further bits, a second group of parallel N-bits with subsequently received codewords, said means for organizing repetitively forming subsequent groups of parallel N-bits regardless the length of the codewords in each group, said means for receiving and grouping, means for outputting and means for organizing each processing said bits only in parallel.

2. The apparatus of claim 1 wherein the codewords are of such length that portions of a codeword statistically randomly occur in successive different N-bit groups.

3. The apparatus of claim 1 wherein said means for determining includes means responsive to the length of the received codewords to generate a control signal representing (1) the cumulative length of consecutively received codewords containing at least N bits, (2) the occurrence of the Nth consecutive received bit, and the number of bits in excess of N, if any, for successively occurring codewords; said means for grouping and for organizing each being responsive to said control signal.

4. The apparatus of claim 1 wherein said means for grouping includes first and second latches, the first latch for receiving N-bits, the second latch for receiving said further bits, said means for grouping further including bit positioning means for shifting the position of successively received bits in ordinal position of receipt in said latches.

5. The apparatus of claim 4 wherein said means for organizing includes switch means for transferring the further bits in said second latch into said first latch in ordinal position of occurrence after a group of N-bits in said first latch has been outputted.

6. Apparatus for efficiently packing sequential occurring variable length codeword data in an input signal into memory means for subsequent transmission over a channel, said memory means having a plurality of data storage locations, each having an N-bit storage capacity, said apparatus comprising:
data grouping means for receiving the bits of said variable length codeword input signal applied as an input thereto in parallel and for organizing said variable length codewords into N-bit long parallel bit data groups, each group containing codeword data in ordinal position according to a first given sequence of occurrence of the data of that data group; and
output means for outputting the bits of said groups in parallel from said grouping means in a second given sequence for storage in said memory means in a third given sequence, each group for storage in a separate, corresponding location whereby each data location containing data is filled to capacity with a single clock pulse, said data grouping means and output means including means for processing the bits of said input signal in parallel throughout.

7. The apparatus of claim 6 wherein said first, second and third given sequences each manifest he sequence of occurrence of the codewords in said signal.

8. The apparatus of claim 6 wherein said data grouping means includes first means responsive to said input signal for generating a second signal indicating the receipt of a first N-bit group and second means including storage means for storing the data of said input signal until at least said first group has been received; said output means including means responsive to said second signal for outputting said received first group.

9. The apparatus of claim 8 wherein said storage means includes means arranged to sequentially store data bits from said input signal in said first given sequence after the outputting of said first group to form a second group in said storage means wherein said first and second groups include portions of the same codeword.

10. The apparatus of claim 6 wherein said data grouping means includes means for receiving the data in said input signal in parallel and said output means includes means for outputting the data from each said group in parallel.

11. The apparatus of claim 6 wherein said grouping means includes shift means for shifting the position of sequentially occurring codewords in parallel until at least N-bits of data are organized in parallel, means responsive to the occurrence of said shifted at least N bits for generating a group signal manifesting said at least N-bits in parallel, said grouping means including latch means for receiving said shifted codewords, said latch means being responsive to said group signal for outputting said received at least N-bits in a group of N-bits.

12. The apparatus of claim 11 wherein said latch means includes a first latch for receiving said N-bits of organized data, switch means for recirculating data from and to said first latch until said at least N-bit of data are accumulated in said first latch, a second latch for receiving organized data bits in excess of N, and means for positioning the bits in said second latch into said first latch in order of occurrence of said first sequence after a group of N-bits is outputted from said first latch.

13. The apparatus of claim 6 wherein said data grouping means includes shift means for shifting the received codewords in parallel until at least N-bits in parallel are accumulated and data accumulating means comprising first and second latches for receiving said shifted at least N-bits in parallel, said first latch for receiving N-bits in parallel, said second latch for receiving bits in excess of N in parallel, means responsive to the occurrence of successive N-bits in said input signal for outputting the N bits in said first latch and for repositioning the bits in excess of N in said second latch in said first given sequence into said first latch.

14. The apparatus of claim 13 wherein said data accumulating means comprises N first switches, each for selectively coupling a different bit of said N shifted bits to a unique corresponding one of N first latch positions, a plurality of second switches, each for selectively coupling a different one of said N positions at an output of said first latch to the input of the first latch for that position, said second latch having a plurality of latch positions, each corresponding to a different received shifted bit and to a different first latch position, a plurality of third switches, each for selectively coupling a different second latch position to corresponding first latch input, and control signal generating means for recirculating the bits in the first latch to itself in ordinal position upon the occurrence of each codeword until N-bits are received by said grouping means and for placing the bits in the second latch into the first latch in ordinal position based on order of receipt after N-bits are outputted from the first latch.

15. Apparatus for efficiently packing sequentially occurring variable length codeword data in an input signal into memory means for subsequent transmission over a channel, said memory means having a plurality of data storage locations, each location having an N-bit storage capacity, said apparatus comprising:
shift means for receiving said input signal and responsive to a control signal for accumulating and shifting in parallel the codeword bits of said received input signal into at least N parallel positions corresponding to the accumulated received codeword bits of a series of codewords;

first means responsive to said control signal for storing in parallel at most N shifted bits of said series of codewords in order of receipt by said shift means;

second means responsive to said control signal for storing in parallel said shifted bits which are in excess of N in said series of codewords;

switch means responsive to said control signal for moving said stored bits in excess of N from said second means into said first means in ordinal position of occurrence and for outputting said N-bits from said first means; and control signal generating means for generating said control signal in response to the receipt of each said codeword.

16. The apparatus of claim 15 wherein said control signal generating means includes means for generating a clock signal manifesting the receipt of said N-bits and means for generating a word length signal manifesting the magnitude of the accumulated bits of the codewords totalling at least N-bits including portions in excess of N if any, then being received, said first and second means and switch means including means responsive to said clock signal and to said length signal.

17. The apparatus of claim 16 wherein said switch means includes means responsive to said control signal for: (1) applying the shifted codeword then being received in ordinal position of receipt in said first means and for (2) causing the bits then stored in said first means to circulate out of and back into said first means and repeating (1) and (2) until at least N-bits have accumulated in said first means.

18. The apparatus of claim 17 wherein said switch means further includes means responsive to the control signal for applying said shifted bits in excess of N in said second means to said first means upon the occurrence of said at least N-bits.

19. The apparatus of claim 15 wherein said shift means has consecutively ordinally numbered shift positions and includes first address means responsive to said control signal for causing the shift means to shift each received codeword an amount corresponding to the accumulated sum of the codeword length of the previously received codewords and bits in excess of N until at least N successive bits are received, said control signal generating means generating a control signal manifesting said excess of N-bits for shifting said shift means from the zero position an amount corresponding to said excess of N-bits.

20. The apparatus of claim 19 wherein said first and second means each include latch means for storing said shifted bits, said switch means including second address means for closing the path from said shift means to said first means an amount corresponding to said previously received codeword length and third address means for opening a path from the latch means at a latch output to a corresponding input thereof, until said excess of N-bits are received, said third address means coupling the second means outputs to the first means inputs in corresponding ordinal position of the bits stored in said second means.

21. The apparatus of claim 20 wherein said first, second and third address means includes means responsive to the sam control signal.

22. The apparatus of claim 15 wherein said control signal generating means includes means for (1) summing a received codeword length signal with a subtract prior received codeword length signal to produce a sum signal, (2) determining if the length of said sum signal is N or greater, and if so, (3) subtracting N from said sum signal to produce said subtract signal, and means for generating a clock signal indicating said sum signal manifesting at least N and for outputting said clock signal and said subtract signal as said control signal.

23. The apparatus of claim 22 including memory means having a plurality of said N-bit storage locations, said control signal generating means including means for generating a clock signal manifesting the outputting of said N-bits, said memory means including means responsive to said clock signal for storing in a corresponding location said outputted N-bits.

24. In a data transmission system, the combination comprising:

means for creating successively occurring codewords of randomly occurring different bit lengths, each codeword representing an information signal, the bits of those codewords containing a plurality of bits being in parallel; and data grouping means for organizing the bits of said successively occurring codewords into a plurality of groups of parallel N-bits, said data group means including means for processing said bits of said codewords into said parallel N-bit groups solely in parallel.

25. The combination of claim 24 further including means for storing said groups in a plurality of corresponding storage locations, each location for storing a different group.

26. The combination of claim 25 wherein each storage location has an N-bit storage capacity.

27. In a data system, means for organizing the data of an input information signal in a data bit group comprising:

a first latch having a plurality of inputs each for receiving a data bit and a like plurality of outputs each for outputting a received data bit, each output corresponding to a different input;

first switch means having open and closed states for selectively coupling the bits of said information signal to a first portion of said plurality of inputs;

second switch means having open and closed states for selectively coupling each latch output of said first portion to its corresponding input;

means for applying data bits from said signal to a second portion of said latch different from and not including any of said first portion; and third switch means for selectively coupling the latch outputs of said second portion to the latch inputs of the first portion.

28. The system of claim 27, further including a second latch coupled to the first latch outputs in said first portion and means for outputting the data from said first latch into the second latch when the first portion is filled with data.

29. The system of claim 28 wherein said means for outputting said data includes means for opening said first and second switch means and closing said third switch means.

30. Apparatus for efficiently packing sequentially occurring variable length codeword data in an input signal into memory means for subsequent transmission over a channel, said apparatus comprising:

means for grouping the bits of said sequentially occurring codewords including portions of one or more codewords in accordance with the length of the codewords into a first group of parallel N-bits in order of occurrence of the bits in a plurality of said successively occurring codewords, said means for grouping including first and second latches, the first latch for receiving N-bits, the second latch for receiving further bits described below, said means for grouping further including bit positioning means for shifting the position of successively received bits in ordinal position of receipt in said latches;

means for determining when said at least N-bits have been grouped and for outputting the N-bit group, the codewords forming said N-bit group at times having further bits; and means for organizing said further bits into their order of occurrence and forming with said organized further bits, a second group of N-bits with subsequently received codewords, said means for organizing repetitively forming subsequent groups of parallel N-bits regardless the length of the codewords in each group.

31. Apparatus for efficiently packing sequentially occurring variable length codeword data in an input signal into memory means for subsequent transmission over a channel, said memory means having a plurality of data storage locations, each having an N-bit storage capacity, said apparatus comprising:

data grouping means responsive to said variable length codeword input signal applied as an input thereto for organizing said variable length codewords into N-bit long data groups, each group containing codeword data in ordinal position according to first given sequence of occurrence of the data of that data group; and output means for outputting said group from said grouping means in a second given sequence for storage in said memory means in a third given sequence, each group for storage in a separate, corresponding location whereby each data location containing data is filled to capacity with a single clock pulse;

said grouping means including shift means for shifting the position of sequentially occurring codewords until at least N-bits of data are organized in parallel, means responsive to the occurrence of said shifted at least N-bits for generating a group signal manifesting said at least N-bits in parallel, said grouping means including latch means for receiving said shifted codewords, said latch means being responsive to said group signal for outputting said received at least N-bits in a group of N-bits;

said latch means including a first latch for receiving said N-bits of organized data, switch means for recirculating data from and to said first latch until said at least N-bit of data are accumulated in said first latch, a second latch for receiving organized data bits in excess of N, and means for positioning the bits in said second latch into said first latch in order of occurrence of said first sequence after a group of N-bits is outputted from said first latch.

32. Apparatus for efficiently packing sequentially occurring variable length codeword data in an input signal into memory means for subsequent transmission over a channel, said memory means having a plurality of data storage locations, each location having an N-bit storage capacity, said apparatus comprising:

shift mean for receiving said input signal and responsive to a control signal for shifting in parallel the information bits of said received input signal into at least N parallel positions corresponding to the accumulated received codeword bits of a series of codewords;

first means responsive to said control signal for storing in parallel at most N shifted bits of said series of codewords in order of receipt by said shift means;

second means responsive to said control signal for storing in parallel said shifted bits which are in excess of N in said series of codewords;

switch means responsive to said control signal for moving said stored bits in excess of N from said second means into said first means in ordinal position of occurrence and for outputting said N-bits from said first means; and control signal generating means for generating said control signal in response to the receipt of each said codeword;

said shift means having consecutively ordinally numbered shift positions and including first address means responsive to said control signal for causing the shift means to shift each received codeword an amount corresponding to the accumulated sum of the codeword length of the pre-viously received codewords and bits in excess of N until at least N successive bits are received, said control signal generating means generating a control signal manifesting said excess of N-bits for shifting said signal means from the zero position an amount corresponding to said excess of N-bits;

said first and second means each including latch means for storing said shifting bits, said switch means including second address means for closing the path from said shift means to said first means an amount corresponding to said previously received codeword length and third address means for opening a path from the latch means at a latch output to a corresponding input thereof, until said excess of N-bits are received, said third address means coupling the second means outputs to the first means inputs in corresponding ordinal position of the bits stored in said second means.

33. Apparatus for efficiently packing sequentially occurring variable length codeword data in an input signal from memory means for subsequent transmission over a channel, said apparatus comprising:

means responsive to a signal manifesting the length of each said codewords for generating a clock pulse corresponding to each successively received N-bit group;

means responsive to said clock pulse for grouping the bits of said sequentially occurring codewords including portions of one or more codewords in accordance with the length of the codewords into a first group of parallel N-bits in order of occurrence of the bits in a plurality of said successively occurring codewords, the codewords forming said N-bit group at times having further bits;

means responsive to said clock pulse for organizing said further bits into their order of occurrence and forming with said organized further bits, a second group of N-bits with subsequently received codewords, said means for organizing repetitively forming subsequent group of parallel N-bits regardless the length of the codewords in each group, and output means responsive to said clock pulse for successively outputting said first and second groups of parallel N-bits, each group of N-bits being outputted in parallel by a different clock pulse.

34. Apparatus for efficiently packing sequentially occurring variable length codeword data in an input signal into memory means for subsequent transmission over a channel;

means for receiving the bits of said sequentially occurring codewords in parallel and for grouping the received bits including portions of one or more codewords in accordance with the length of the codewords into a first group of parallel N-bits in order of occurrence of the bits in a plurality of said successively occurring codewords, said means for grouping including bit positioning means for parallel shifting the position of the successively received bits in accordance with their parallel received ordinal position into said N-bit group;

means for determining when said at least N-bits have been grouped and for outputting the parallel N-bits group, the codewords forming said N-bit group at times having further bits; and means for organizing said further bits into their order of occurrence and forming with said organized further bits, a second group of parallel N-bits with subsequently received codewords, said means for organizing repetitively forming subsequent groups of parallel N-bits regardless the length of the codewords in each group.

* * * * *